United States Patent [19]

Oskouy et al.

[11] Patent Number: 5,859,856
[45] Date of Patent: Jan. 12, 1999

[54] METHOD AND APPARATUS FOR ROUTING INTERLEAVED INCOMING ATM CELLS WITH REDUCED CHANNEL SWITCHING

[75] Inventors: Rasoul M. Oskouy, Fremont; Denny Gentry, Palo Alto, both of Calif.

[73] Assignee: Sun Microsystems, Inc., Mountain View, Calif.

[21] Appl. No.: 958,851

[22] Filed: Oct. 27, 1997

Related U.S. Application Data

[63] Continuation of Ser. No. 473,514, Jun. 7, 1995, abandoned, which is a continuation of Ser. No. 215,302, Mar. 21, 1994, abandoned.

[51] Int. Cl.$^6$ .................................................. H04L 11/20
[52] U.S. Cl. .......................... 370/905; 370/299; 370/235; 370/355; 370/356; 370/357; 370/902; 370/395
[58] Field of Search .................................. 370/299, 235, 370/355, 356, 357, 902, 905, 395

[56] References Cited

U.S. PATENT DOCUMENTS

| | | | |
|---|---|---|---|
| 4,947,388 | 8/1990 | Kuwahara et al. | 370/60 |
| 5,126,999 | 6/1992 | Munter et al. | 370/60 |
| 5,136,584 | 8/1992 | Hedlund | 370/94.1 |
| 5,144,619 | 9/1992 | Munter | 370/60.1 |
| 5,241,536 | 8/1993 | Grimble et al. | 370/60.1 |
| 5,278,828 | 1/1994 | Chao | 370/85.6 |
| 5,280,470 | 1/1994 | Buhrke et al. | 370/13 |
| 5,285,945 | 2/1994 | Lehnert et al. | 370/60 |
| 5,325,356 | 6/1994 | Lyles | 370/60 |
| 5,327,428 | 7/1994 | Van As et al. | 370/99.2 |
| 5,379,297 | 1/1995 | Glover | 370/60.1 |
| 5,406,554 | 4/1995 | Parry | 370/58.1 |
| 5,448,564 | 9/1995 | Thor | 370/94.1 |
| 5,459,723 | 10/1995 | Thor | 370/60 |

FOREIGN PATENT DOCUMENTS

| | | |
|---|---|---|
| 0 299 473 A2 | 1/1989 | European Pat. Off. . |
| 0 378 195 A2 | 7/1990 | European Pat. Off. . |

OTHER PUBLICATIONS

"Cut–Through Switch for Frame Relay Networks", *IBM Technical Disclosure Bulletin*, vol. 32, No. 9A, Feb. 1990, pp. 483–487.

European Search Report for Application No. EP 95 30 1841 dated Aug. 28, 1997 (3 pgs.).

Chao, H. Jonathan, "A Novel Architecture for Queue Management in ATM Networks", *IEEE Global Telecommunications Conference 'Globecom '91: Countdown to the New Millennium*, Conference Record vol. 3 of 3, Dec. 2–5, 1991, pp. 1611–1618.

Zukowski, Charles and Tong–Bi Pei, "VLSI Implementations of ATM Buffer Management", *IEEE International Conference of Communications '91—Communications: Rising to New Heights*, Conference Record vol. 2 of 3, Jun. 23–26, 1991, pp. 716–720.

*Primary Examiner*—Parshotam S. Lall
*Assistant Examiner*—Saleh Najjar
*Attorney, Agent, or Firm*—Blakely Sokoloff Taylor & Zafman

[57] ABSTRACT

A number of storage units and a number of state machines are provided to reorder interleaved ATM data cells for a number of channels incoming to a networked host computer. The storage units store the incoming ATM data cells, a number of data structures tracking the stored ATM data cells for the channels and the free resources, and an unload schedule queue. The state machines load and unload the incoming ATM data cells, and update the tracking data structures and schedule queue accordingly.

21 Claims, 6 Drawing Sheets

METHOD AND APPARATUS FOR ROUTING INTERLEAVED INCOMING ATM CELLS WITH REDUCED CHANNEL SWITCHING

This is a continuation of application Ser. No. 08/473,514, filed Jun. 7, 1995 which is a continuation of application Ser. No. 08/215,302, filed Mar. 21, 1994 both abandoned.

BACKGROUND OF THE INVENTION

Field of the Invention

The present invention relates to the field of computer networks, in particular, the network interfaces of the networked computer systems. More specifically, the present invention relates to the reordering of incoming interleaved asynchronous transfer mode (ATM) cells.

Background

Traditionally, in a computer system network, computer systems are physically connected to each other via media connected to the network interfaces of the computer systems. Various approaches have been developed in the art to transfer data between the computer systems. Typically, each network interface comprises a small number of direct memory access (DMA) channels, each having a predetermined bandwidth, for transferring data. The network services of the operating systems running on these computer systems handle the physical transfer of data between the computer systems in the predetermined bandwidth rates in accordance to pre-established protocols. The applications running on the computer systems are shielded from the physical details. The applications manage the transfer data at the data structure level.

For a large computer system network, it is often desirable to connect the computer systems to each other via switches. The switches may include public and local switches. A computer system is connected to a local switch via its network interface and a medium. The local switch is in turn directly or indirectly coupled to a public switch. The public switches are coupled to each other. For such large computer system networks, it is further desirable for the switches to be able to transfer data between the computer systems asynchronously. Thus, a number of cell based asynchronous transfer approaches for transferring data between computer systems in a large computer system network have emerged in the art.

These traditional cell based asynchronous transfer approaches typically cellify and reassemble the transfer data packet at the network interface level. Cellification and reassembly of the transfer data packet at the network interface level has at least two disadvantages. One, it imposes greater storage requirement on the network interface. Two, the received data are not available until the entire data packet has been reassembled. Thus, it is further desirable if the transfer data can be transmitted and made available as the transfer data packet is being segmented and reassembled.

In U.S. patent application, Ser. No. 07/995,591, currently pending assigned to the assignee of the present invention, a cell based asynchronous transfer approach that overcomes the disadvantages of the prior art approaches was disclosed. The disclosed approach provides host computer based cellification and reassembly of the transfer data packets.

Under the disclosed approach, a control memory is provided for storing the control and state information of a number of virtual direct memory access (DMA) channels. A control memory arbiter and a control memory data bus are also provided to arbitrate accesses to the control memory to facilitate asynchronous transmit and receive. Separate areas in the control memory are provided for storing the control and state information of the transmit DMAs, and the receive DMAs. Additionally, descriptive information about the transmit/receive data rings and their descriptors, the data packets being transferred and their cells are also stored for the transmit and receive DMAs.

Additionally, a segmentation assembly/re-assembly (SAR) module which cellifies transmit packets and reassembles receive packets on the host computer is also provided for segmenting transmit packets into transmit cells for transmission, and reassembling receive cells into receive packets. Two series of FIFOs are provided for staging the transmit and receive cell payloads. Lastly, complement to the SAR module, a media cell manager (MCM) module is provided for packaging the transmit cell payloads before their transmission, and unpackaging the receive cell payloads upon their receipts.

However, some of host computer systems implement virtual address spaces, wherein each virtual address space comprises a number of typically discontiguously physical memory pages. At any point in time, only a subset of the virtual address to physical address translation entries are cached. Since the ATM cells of the various DMA channels can be highly interleaved and directed to different channels, the disclosed approach can result in highly interleaved accesses to different address translation entries, thereby resulting in excessive filling and eviction of address translation entries on such a system. Thus, it is desirable to be able to strike a performance balance for these systems to be able to perform cellification and some amount of reassembly on the host computers but without causing excessive filling and eviction of address translation entries. More specifically, it is desirable to be able to buffer and reorder the ATM cells before reassembling them on the host computers.

As will be described in detail below, the present invention provides for such a method and apparatus that advantageously achieve these and other desirable results.

SUMMARY OF THE INVENTION

Under the present invention, the desirable results are advantageously achieved by providing a number of storage units and a number of state machines. The storage units store incoming ATM cells for a number of channels, a number of data structures tracking the stored ATM cells and the free resources, and a schedule queue for channels to be unloaded. The state machines load and unload the ATM cells and update the tracking data structures and the schedule queue accordingly.

In one embodiment, the storage units comprise an ATM cell storage unit and a control data storage unit. The ATM cell storage unit has m storage slots for storing m incoming ATM cells. The control data storage unit has storage capacity for storing a channel state table having n1 entries for n1 channels, one for each channel, a first-free-resource pointer, an array of m linking relationship pointers corresponding to the m storage slots of the ATM cell storage unit, and a storage queue for queuing up to n2 channel identifiers identifying up to n2 channels to be unloaded, where n2 is less than or equal to n1.

Each entry of the channel state table comprises a start and an end linking pointer pointing to two linking relationship pointers in the array for a channel. The first-free-resource pointer points to a linking relationship pointer in the array corresponding to the first free storage slot of the ATM cell storage unit. Each linking relationship pointer in the array either points to another linking relationship pointer in the array or denotes end of linking relationship. Together they form a number of link lists for the channels identifying where their ATM cells are stored in the ATM cell storage unit, and a link list of the free storage slots identifying where they are located in the ATM cell storage unit.

The state machines comprise a load state machine for loading incoming ATM cells into the storage slots in the ATM cell storage unit and an unload state machine for unloading ATM cells from the storage slots in the ATM cell storage unit. Both the loading and unloading state machines are further responsible for performing various ATM cell and free resources tracking data management functions.

For every cell time opportunity, the load state machine loads an incoming ATM cell into the first free storage slot and updates the tracking data structures accordingly. Additionally, if either the incoming ATM cell is the last cell of a data packet or the number of ATM cells stored for the channel has reached a predetermined threshold, and the channel is not currently scheduled to be unloaded, the load state machine queues the channel identifier of the channel into the schedule queue identifying the channel as one of the channels to be unloaded.

The unload state machine is in an inactive state if the schedule queue is empty. The unload state machine enters an active state when the schedule queue becomes non-empty with the scheduling of channels to be serviced, and remains in the active state as long as the schedule queue is non-empty. The unload state machine reenters the inactive state when the schedule queue becomes empty again with the servicing of all scheduled channels.

While in the active state, the unload state machine unloads the stored ATM cells for the channel at the head of the schedule queue. Upon doing so, the unload state machine updates the tracking data structures accordingly. Additionally, the unload state machine dequeues the channel identifier of a channel from the schedule queue, removing the channel as one of the channels to be unloaded, upon finishing serving the channel.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
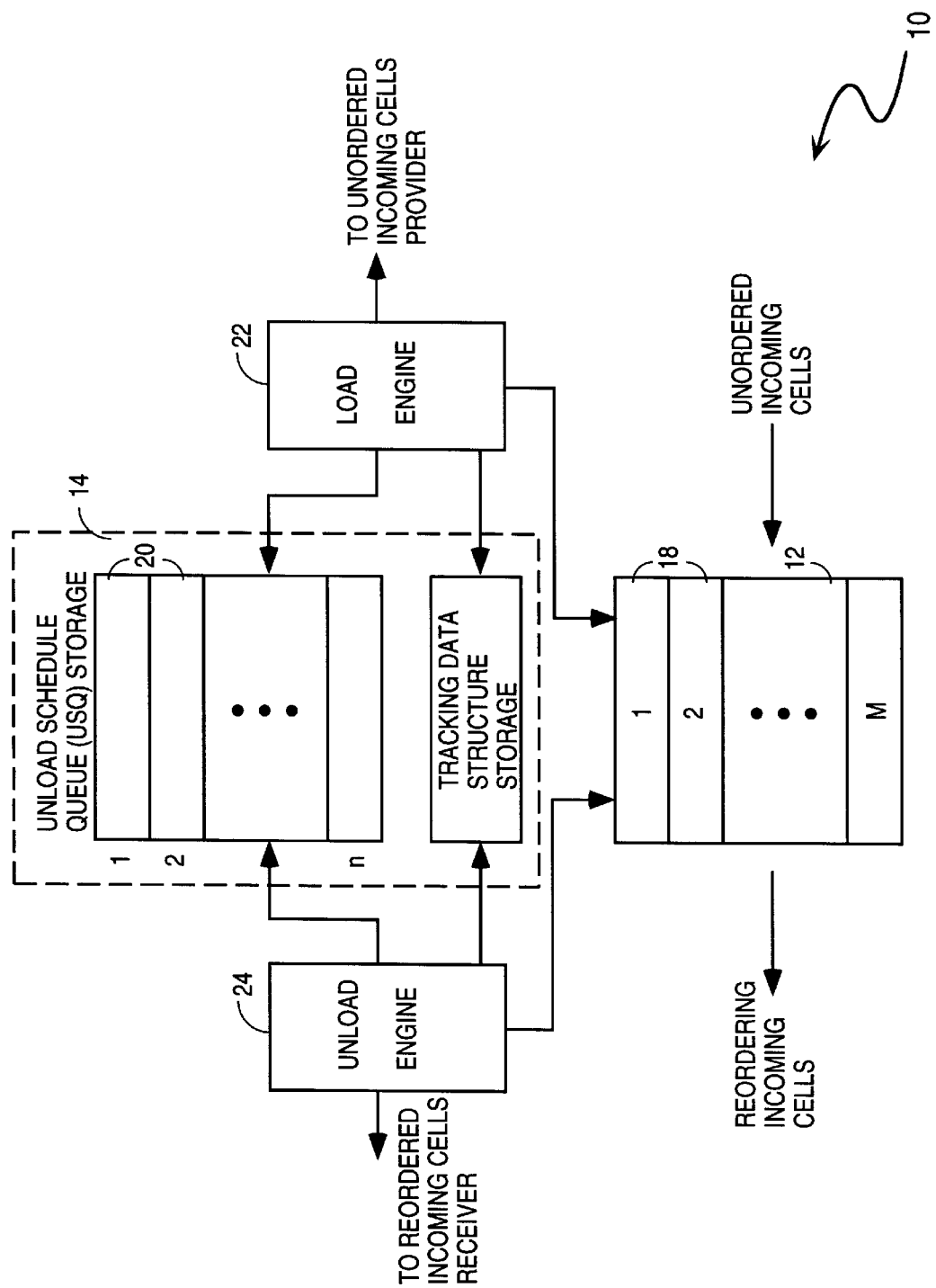
FIG. 1 illustrates the major components of the present invention including the ATM cell storage unit, the control data storage unit, the load and unload state machines.

Referring now to FIG. 1, a block diagram illustrating the major components of the present invention is shown. The present invention for reordering incoming interleaved ATM cells 10 comprises a number of storage units 12–14, and two state machines 22–24. The storage units 12–14 comprise an ATM cell storage unit 12, a tracking data structure storage unit 13, and a schedule queue storage unit 14. The state machines 22–24 comprise a load state machine 22 and an unload state machine 24. These elements 12–14, and 22–24 are coupled to each other as shown.

The ATM cell storage unit 12 has m storage slots for storing up to m incoming ATM cells 18 for the various channels. The control data storage unit 14 has storage capacity for storing various tracking data structures for tracking the stored ATM cells 18 for n1 channels and the free resources of the ATM cell storage unit 12. The control data storage unit 14 further stores an unload schedule queue for queueing up to n2 channel identifiers 20 identifying up to n2 channels to be unloaded, where n2 is less than or equal to n1. While the present invention is being described with separate storage units 12–14, based on the descriptions to follow, it will be appreciated that the present invention may be practiced with some or all of these storage units 12–14 divided or combined.

Figure 2:
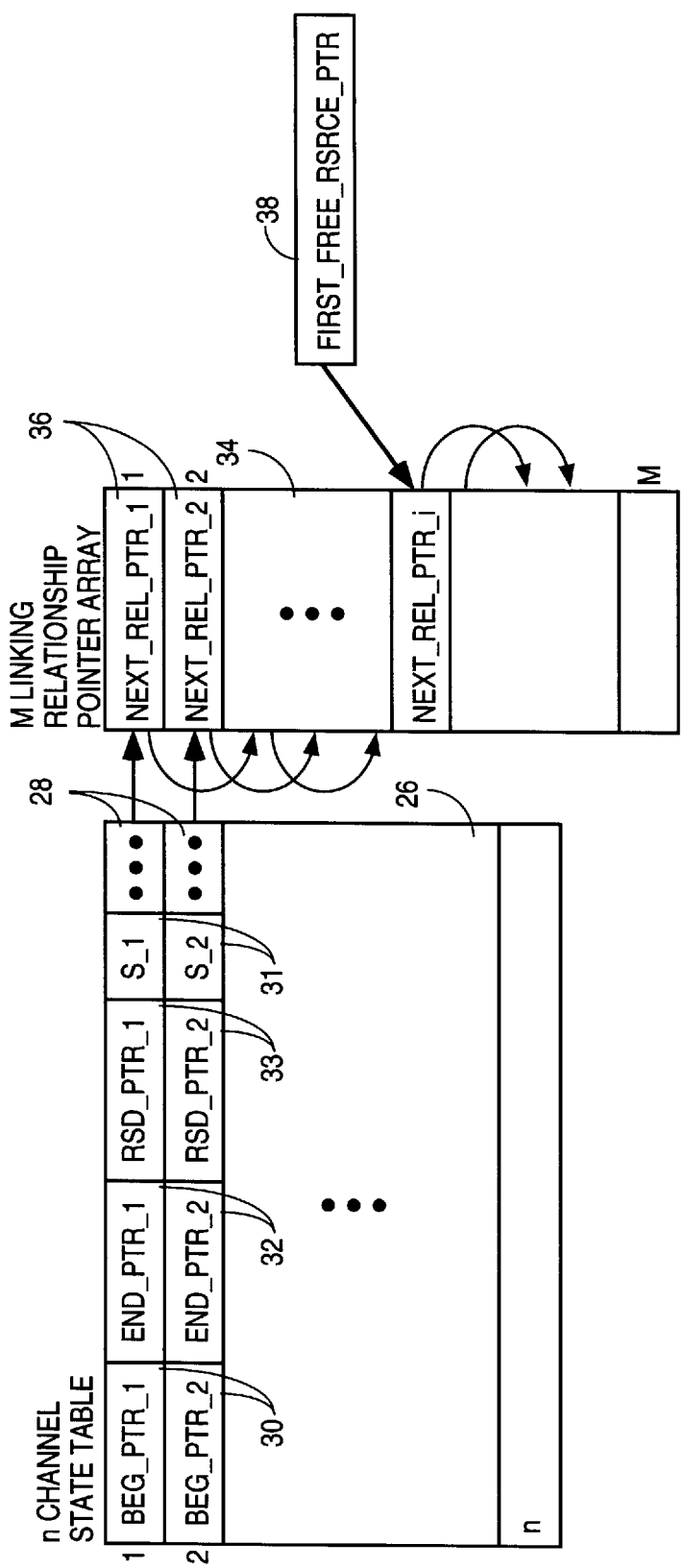
FIG. 2 illustrates one embodiment of the tracking data structures in further detail.

Referring now to FIG. 2, a block diagram illustrating one embodiment of the tracking data structures in further detail is shown. In this embodiment, the tracking data structures comprises a channel state table 26, a first-free-resource pointer 38, and an array of linking relationship pointers 34. The channel state table 26 stores up to n1 channel state entries 28 for n1 channels, one entry per channel. The array of linking relationship pointers 34 comprises m linking relationship pointers 36 corresponding to the m ATM cell storage slots.

Each entry 28 of the channel state table 26 comprises a start linking pointer (BEG_PTR_i) 30 and an end linking pointer (END_PTR_i) 32 pointing to two linking relationship pointers (NEXT_REL_PTR_i) 36 in the array 34 corresponding to a starting and an ending ATM cell storage slot for a channel. The start linking pointer (BEG_PTR_i) 30 is set to a special predetermined value, such as zero, if no ATM cell storage slot is currently in use for the channel. The end linking pointers (END_PTR_i) 32 allow the load state machine 22 to quickly determine the last ATM cell storage slots of the channels without having to search through the link lists of the channels, since time is of the essence at the time of loading.

The first-free-resource pointer (FIRST_FREE_RSRCE_PTR) 38 points to a linking relationship pointer 36 in the array 34 corresponding to the first free ATM cell storage slot. The first-free-resource pointer (FIRST_FREE_RSRCE_PTR) 38 is also set to a special predetermined value, such as zero, if all ATM cell storage slots are currently in use. In other words, no free resource available.

Each linking relationship pointer (NEXT_REL_PTR_i) 36 in the array 34 either points to another linking relationship pointer (NEXT_REL_PTR_) 36 in the array 34 or denotes end of linking relationship with a special predetermined value, such as zero.

At initialization, the first-free-resource pointer (FIRST_FREE_RSRCE_PTR) 38 is initialized to point to the first linking relationship pointer (NEXT_REL_PTR_1) 36 in the array 34, and each of the linking relationship pointers (NEXT_REL_PTR_i) 36 is initialized to point to the next immediately following linking relationship pointer (NEXT_REL_PTR_i+1) 36 in the array 34. In other words, the first linking relationship pointer (NEXT_REL_PTR_1) 36 is initialized to point to the second linking relationship pointer (NEXT_REL_PTR_2) 36, the second linking relationship pointer (NEXT_REL_PTR_2) 36 is initialized to point to the third linking relationship pointer (NEXT_REL_PTR_3) 36, and so forth.

Thus, together these pointers 30–38 form a number of link lists for a number of channels identifying where the ATM cells 18 are stored for the various channels, and a link list identifying where the free ATM cell storage slots are.

For example, the first channel state entry 28 may contain a start linking pointer (BEG_PTR_1) 30 pointing to the first linking relationship pointer (NEXT_REL_PTR_1) 36, which points to the third linking relationship pointer (NEXT_REL_PTR_3) 36, which points to the fifth linking relationship pointer (NEXT_REL_PTR_5) 36, which denotes the end of linking relationship, thereby forming a first link list identifying the ATM cells are stored in the first, third, and fifth storage slots for the first channel. The end linking pointer (END_PTR_1) 32 would be pointing to the fifth linking relationship pointer (NEXT_REL_PTR_5) 36. The second channel state entry 28 may contain a start linking pointer (BEG_PTR_2) 30 pointing to the second linking relationship pointer (NEXT_REL_PTR_2) 36, which points to the fourth linking relationship pointer (NEXT_REL_PTR_4) 36, which points to the sixth linking relationship pointer (NEXT_REL_PTR_6) 36, which denotes the end of linking relationship, thereby forming a second link list identifying the ATM cells are stored in the second, fourth, and sixth storage slots for the second channel. The end linking pointer (END_PTR_2) 32 would be pointing to the sixth linking relationship pointer (NEXT_REL_PTR_6) 36.

In like manner, the first-free-resource pointer (FIRST_FREE_RSRCE_PTR) 38 pointing to the seventh linking relationship pointer (NEXT_REL_PTR_7) 36, which points to the eighth linking relationship pointer (NEXT_REL_PTR_8) 36, . . . , which points to the m-1th linking relationship pointer (NEXT_REL_PTR_m-1)36, which points to the $m^{th}$ linking relationship pointer (NEXT_REL_PTR_m) 36, which denotes the end of linking relationship, thereby forming a resource link list identifying the seventh through $m^{th}$ storage slots as free ATM cell storage slots.

Additionally, each entry 28 of the channel state table 26 further comprises a schedule bit (S_i) 31 when set indicating the channel has been scheduled for unloading. Similar to the end linking pointers (END_PTR_i) 32, the schedule bits (S_i) 31 allow the load state machine 22 to quickly determine whether a channel has been scheduled for unloading without searching through the entire schedule queue.

The residual pointers (RSD_PTR_i) 33 will be described in more detail below in conjunction with the exemplary "on-board" application of the teachings of the present invention, directly incorporating the elements of the present invention in a network interface.

Figure 3:
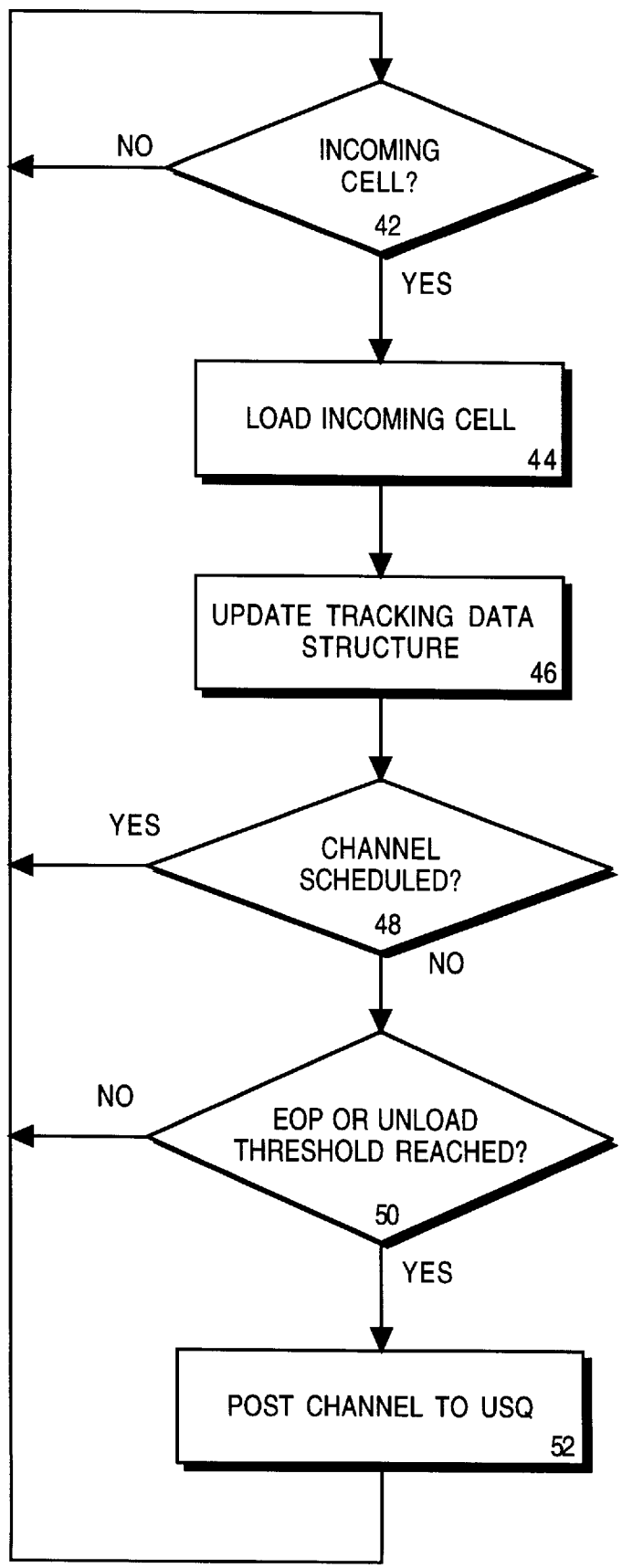
FIG. 3 illustrates the operational flow of the load state machine.

Referring now to FIG. 3, a block diagram illustrating the operational flow of the load state machine is shown. For every cell time opportunity, the load state machine 22 determines if there is an incoming ATM cell, block 42. If there is no incoming ATM cell, the load state machine 22 takes no further action until the next cell time opportunity.

If there is an incoming ATM cell, the load state machine 22 determines the first free storage slot using the first-free-resource pointer, and loads the incoming ATM cell into the first free storage slot, block 44. In the presently preferred embodiment, the storage capacity of the ATM cell storage unit 12 is designed to be sufficiently large to minimize the possibility of using up all storage slots. However, in the unlikely event that all storage slots are used, under the presently preferred embodiment, the incoming ATM cell will not be loaded, and will be lost.

Upon loading the incoming ATM cell into the first free storage slot, the load state machine 22 updates the tracking data structures accordingly, block 46. More specifically, for the above described preferred tracking data structures, if the incoming ATM cell is the first ATM cell stored for the channel, both the start and end pointers 30–32 of the channel entry 28 are updated to point to the linking relationship pointer 36 corresponding to the storage slot. On the other hand, if the incoming ATM cell is not the first ATM cell stored for the channel, then both the end pointer 32 of the channel entry 28 and the last linking relationship pointer 36 of the channel are updated to point to the linking relationship pointer 36 corresponding to the storage slot. Additionally, in either case, the linking relationship pointer 36 corresponding to the storage slot is updated to denote end of linking relationship; and the first-free-resource pointer 38 is updated to point to the linking relationship pointer 36 corresponding to the next free storage slot.

Upon updating the tracking data structures, the load state machine 22 checks the channel state entry 28 to determine if the channel has been scheduled for unloading, block 48. If the channel has been scheduled for unloading, the load state machine 22 takes no further action until the next cell time opportunity. If the channel has not been scheduled for unloading, the load state machine 22 further determines if either the incoming cell is the last cell of a data packet, or the number of ATM cells stored for the channel has reached a predetermined threshold, block 52. If neither conditions are met, the load state machine 22 takes no further action until the next cell time opportunity. If at least one of the conditions is met, the load state machine 22 queues the channel identifier of the channel into the schedule queue identifying the channel as one of the channels to be unloaded, block 52.

Figure 4:
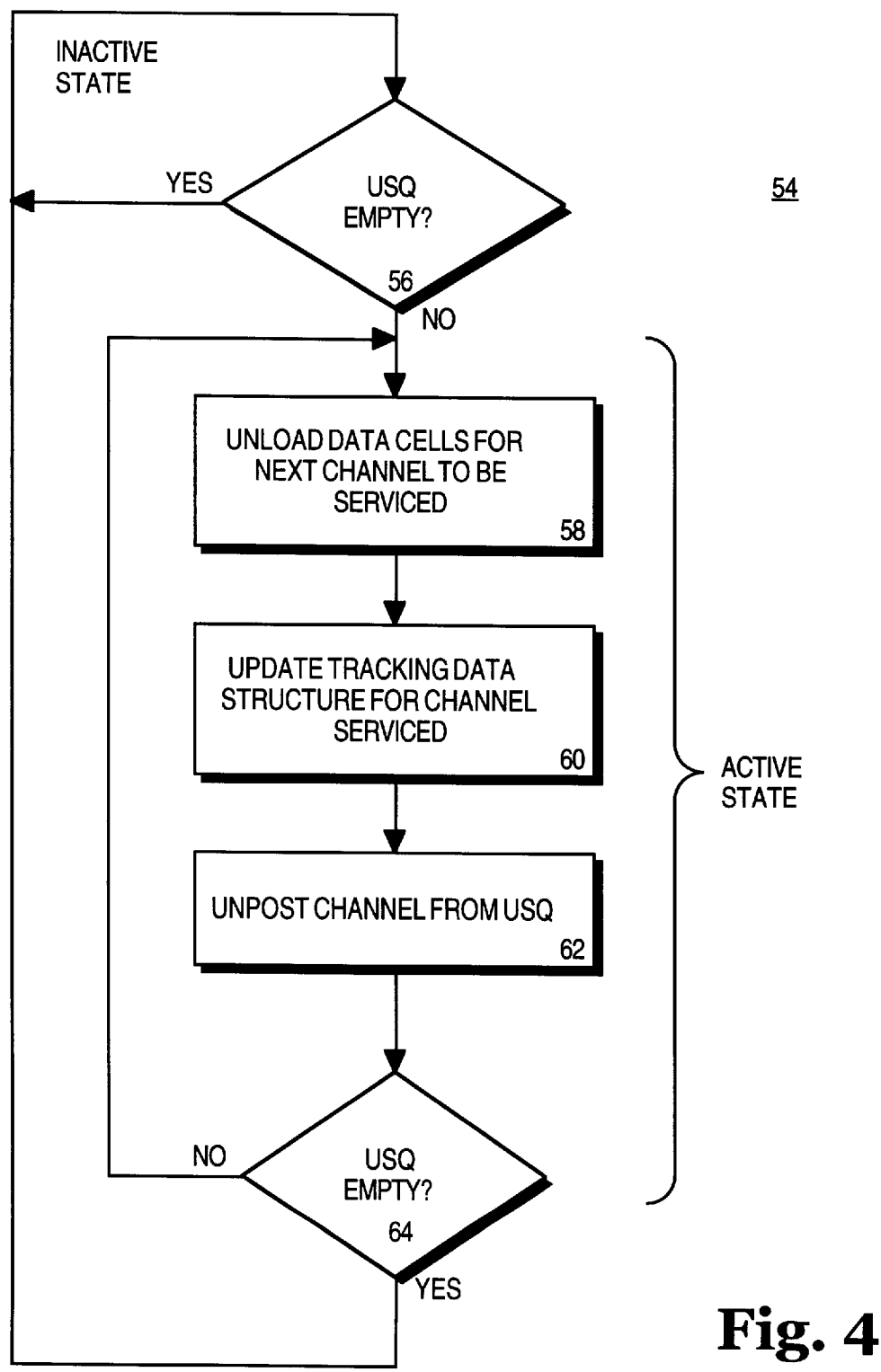
FIG. 4 illustrates the operational flow of the unload state machine.

Referring now to FIG. 4, a block diagram illustrating the operational flow of the unload state machine is shown. The unload state machine 24 is in an inactive state if the schedule queue is empty, block 56. The unload state machine enters an active state when the schedule queue becomes non-empty with the scheduling of channels to be serviced, and remains in the active state as long as the schedule queue is non-empty, blocks 58–64. The unload state machine reenters the inactive state when the schedule queue becomes empty again with the servicing of all scheduled channels, block 64.

While in the active state, the unload state machine unloads the stored ATM cells for the channel at the head of the schedule queue, block 58. Upon doing so, the unload state machine updates the tracking data structures accordingly, block 60. More specifically, for the above described tracking data structures, the unload state machine 24 updates the first-free-resource pointer 38 to point to the linking relationship pointer 36 corresponding to the last serviced storage slot, the linking relationship pointer 36 corresponding to the last serviced storage slot to point to the linking relationship pointer 36 corresponding to the last minus one fully serviced storage slot, . . . , and the linking relationship pointer 36 corresponding to the first serviced storage slot to point to the linking relationship pointer 36 previously pointed to by the first-free-resource pointer 38. In other words, the serviced storage slots are returned to the free resource pool in reverse order with the last serviced storage slot being put in the front of the list of free storage slots.

Upon updating the tracking data structures, the unload state machine 24 updates the unload scheduling information accordingly, block 62. The unload state machine 24 dequeues the channel identifier of the channel it just serviced from the schedule queue, thereby unscheduling the channel. For the above described embodiment having a s-bit 31 in the channel state entry 28, the unload state machine 24 further unsets the s-bit 31 to denote the channel is no longer scheduled to be unloaded.

Upon unscheduling the serviced channel, the unload state machine 24 determines if the schedule queue is empty, i.e. all scheduled channels have been serviced, block 64. If the schedule queue is not empty, the unload state machine 24 repeats blocks 58–62 for the next channel at the head of the schedule queue. However, if the schedule queue is empty, the unload state machine 24 enters into the inactive state.

Figure 5:
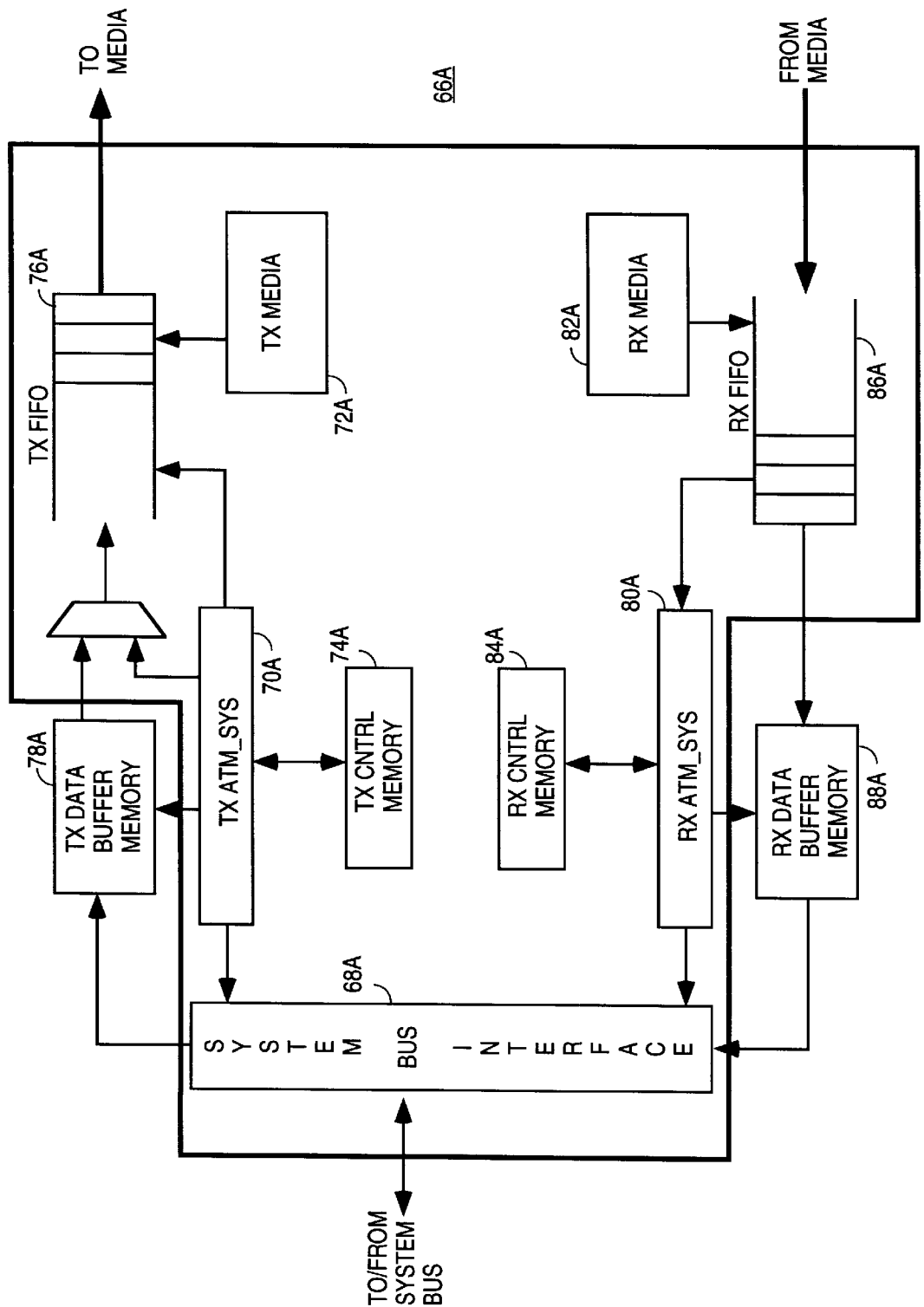
FIG. 5 illustrates an exemplary "on-board" application of the teachings of the present invention, directly incorporating the various elements in a network interface.

Referring now to FIG. 5, a block diagram illustrating an exemplary "on-board" application of the teachings of the present invention is shown. The elements of the present invention are directly incorporated into the network interface 66a. As illustrated, the network interface 66a comprises a transmit segmentation module (TX_ATM_SYS) 70a, a receive reassembly module (RX_ATM_SYS) 80a, a transmit media manager module (TX_Media) 72a, and a receive media manager module (RX_Media) 82a. Additionally, the network interface 66a comprises a transmit control memory (TX_Cntrl_Mem) 74a, a receive control memory (RX_Cntrl_Mem) 84a, a transmit data buffer memory (TX_DB_Mem) 78a, a receive data buffer memory (RX_DB_Mem) 88a, a transmit first-in-first-out (TX_FIFO) 76a, a receive first-in-first-out (RX_FIFO) 86a, and a system bus interface 68a. These elements are coupled to each other as shown. The system bus interface 68a in turn is coupled to a system bus of a host computer.

In one embodiment, the network interface 66a, except for TX_DB_Mem 78a and RX_DB_Mem 88a, is disposed on one single integrated circuit (chip), and TX_DB_Mem 78a and RX_DB_Mem 88a are disposed on external memory.

TX_ATM_SYS 70a, in cooperation with the other transmit elements 74a–78a, segments the transmit packets into transmit cells for transmissions. TX_ATM_SYS 70a cellifies the transmit packets partially on the host computer and partially on the network interface 68a itself. RX_ATM_SYS 80a, in cooperation with the other receive elements 84a–88a, reassembles the receive cell payloads into receive packets. RX_ATM_SYS 80a reassembles the receive packets partially on the host computer and partially on the network interface 66a itself. TX_Media 72a packages the transmit cell payloads of transmit packets before transmission. RX_Media 82a unpackages receive cell payloads for subsequent reassembly into receive packets.

TX_Cntrl_Mem and RX_Cntrl_Mem, 74a and 84a, store the control information for cellifying transmit packets and reassembling receive packets respectively. TX_DB_Mem and RX_DB_Mem, 78a and 88a, store the transmit and receive cell payloads respectively. TX_FIFO and RX FIFO, 76a and 86a, stage the packaged transmit cell payloads and unpackaged transmit cell payloads for transmission and reassembly respectively. The system bus interface 68a interfaces with the system bus of the host computer.

For this exemplary network interface 68a, the ATM cell storage unit 12 of the present invention is integrated as part of the RX_DB_Mem 88a. The ATM cell storage unit 12 has sufficient capacity for storing m 48 bytes unpackaged ATM cells. The tracking data structure and schedule queue storage unit 14 of the present invention is integrated as part of the RX_Cntrl_Mem 84a. As described earlier, the tracking data structure and schedule queue storage unit 14 has sufficient capacity for storing a state table for n1 channels, an array of m linking relationship pointers for the m corresponding storage slot, a first free resource pointer, and an unload schedule queue for n2 channels, where n2 is less than or equal to n1.

The load and unload state machines 22 and 24 of the present invention are integrated as part of the RX_ATM_SYS 80a. The unload state machine 24 transfers the unload ATM cell to the host computer via the system bus interface and the system bus. Preferably, the transfer of stored ATM cells is optimized for the system bus. In one embodiment where the host computer comprises an SBus the unload state machine 24 transfers the stored ATM cells in multiple burst of 64 bytes. Preferably, unless the last ATM cell to be serviced is the last data packet, residual data less than 64 bytes of the last serviced ATM cell are left in the ATM cell storage unit and unloaded the next time the channel is serviced.

To accommodate this preferred manner of handling residual data, each channel state entry 28 of the channel state table 26 is further provided with a residual pointer (RSD_PTR_i) 33 pointing to the last partially serviced storage slot. The unload state machine 24 updates the residual pointer (RSD_PTR_i) to point to the last partially serviced storage slot, when it leaves residual data behind for the next service opportunity. Furthermore, the unload state machine 24 checks the residual pointers (RSD_PTR_i) to determine if there were residual data left behind from the last service opportunity at the commencement of each service opportunity. The SBus is a high-performance system and input/output (I/O) interconnect for use in highly integrated computers, such as Sun Workstations® manufactured by Sun Microsystems, Inc., of Mountain View, Calif. For more detailed description of the SBus, readers are referred to the technical literature published by Sun Microsystems, Inc. (Sun Workstation is a registered trademark of Sun Microsystems, Inc.)

Except for teachings of the present invention, the fact that TX_ATM_SYS 70a and RX_ATM_SYS 80a perform cellification of transmit data packets and reassembly of receive data packets partially on the host computer system and partially on the network interface 66a itself utilizing TX_DB_Mem 78a and RX_DB_Mem 88a respectively, and TX_Media 72a and RX_Media 82a cooperate primarily with the TX_FIFO 76a and the RX_FIFO 86a respectively, the functions and constitutions of these elements 72a–78a, 82a–88a, and 68a, are similar to like elements described in U.S. patent application, Ser. No. 07/995,591, filed on Dec. 22, 1992, which is hereby fully incorporated by reference. In some cases, such as TX_Media 72a and RX_Media 82a, the functions and constitutions of the elements are simplified.

Figure 6:
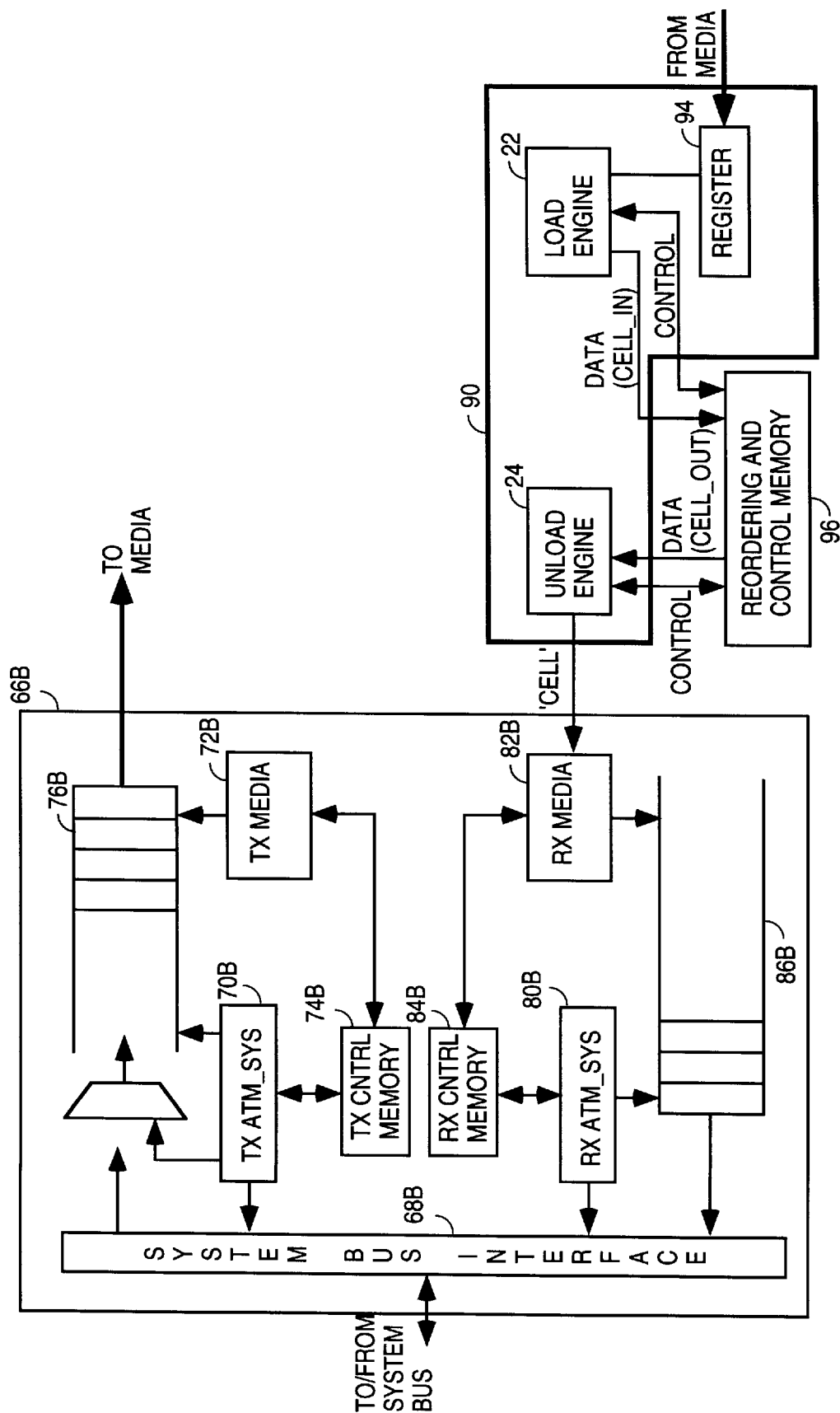
FIG. 6 illustrates an exemplary "out-board" application of the teachings of the present invention, disposing the various elements on an external integrated circuit designed to cooperate with a network interface.

Referring now to FIG. 6, a block diagram illustrating an "outboard" application of the teachings of the present invention is shown. The elements of the present invention are disposed on an external integrated circuit designed to cooperate with a network interface 66b. As illustrated, the network interface 66b comprises a transmit segmentation module (TX_ATM_SYS) 70b, a receive reassembly module (RX_ATM_SYS) 80b, a transmit media manager module (TX_Media) 72b, and a receive media manager module (RX_Media) 82b. Additionally, the network interface 66b comprises a transmit control memory (TX_Cntrl_Mem) 74b, a receive control memory (RX_Cntrl_Mem) 84b, a transmit first-in-first-out (TX_FIFO) 76b, a receive first-in-first-out (RX_FIFO) 86b, and a system bus interface 68b. These elements are coupled to each other as shown. The system bus interface 68b in turn coupled to a system bus of a host computer. The network interface 66b is disposed on one single integrated circuit.

TX_ATM_SYS 70b, in cooperation with the other transmit elements 72b–78b, segments the transmit packets into transmit cells for transmissions. TX_ATM_SYS 70b cellifies the transmit packets on the host computer. RX_ATM_SYS 80b, in cooperation with the other receive elements 82b–86b, reassembles the receive cell payloads into receive packets. RX_ATM_SYS 80b reassembles the receive packets on the host computer and partially on the network interface 66b itself. TX_Media 72b, in cooperation with the other transmit elements 70b and 74b–76b, packages the transmit cell payloads of transmit packets before transmission. RX_Media 82b, in cooperation with the other receive elements 80b and 84b–86b, unpackages receive cell payloads for subsequent reassembly into receive packets.

TX_Cntrl_Mem and RX_Cntrl_Mem, 74b and 84b, store the control information for cellifying transmit packets and reassembling receive packets respectively. TX_FIFO and RX FIFO, 76b and 86b, stage the packaged transmit cell payloads and unpackaged transmit cell payloads for transmission and reassembly respectively. The system bus interface 68b interfaces with the system bus of the host computer. The functions and constitutions of these elements 72a–78a, 82a–88a, and 68a, are similar to like elements described in the above identified U.S. patent application.

The ATM cell storage unit 12 as well as the tracking data structure and schedule queue storage unit 14 of the present invention are disposed as part of an external reordering and control memory 96. The load and unload state machines 22 and 24 of the present invention are disposed on the integrated circuit 90, and coupled to the external reordering and control memory 96 as shown. Additionally, the integrated circuit 90 comprises a staging register 94 coupled to the load engine 22 as shown.

The ATM cell storage unit 12 has sufficient capacity for storing m 54 bytes packaged ATM cells. As described earlier, the tracking data structure and schedule queue storage unit 14 has sufficient capacity for storing a state table for n1 channels, an array of m linking relationship pointers for the m corresponding storage slot, a first free resource pointer, and an unload schedule queue for n2 channels, where n2 is less than or equal to n1.

The staging register 94 receives the ATM cells from the input media, staging them before storing them into the ATM cell storage slots in the reordering memory 96 under the control of and through the load state machine 22. The unload state machine 24 unloads and transfers the stored ATM cells to the network interface 66b.

Since the reordering is performed outside the network interface 66b, the reordering of the ATM cells is completely transparent to the network interface 66b. To the network interface 66b, the ATM cells are merely arriving in a more orderly and less interleaved manner, as if the senders of these ATM cells were coordinating the transmissions among themselves.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An apparatus comprising:
    at least one storage unit comprising:
        a first plurality of storage slots, said first plurality of storage slots to temporarily store interleaved incoming asynchronous transfer mode (ATM) cells from an input communication line, said cells comprising a variable number of channels,
        a second plurality of storage slots, said second plurality of storage slots to store a plurality of data structures, said data structures to track the storage slots of currently stored ATM cells for each of the variable number of channels, and to track free storage slots of said first plurality of storage slots available to temporarily store additional incoming ATM cells from the input communication line, and
        a third plurality of storage slots, said third plurality of storage slots to store a channel-based unload schedule, said channel-based unload schedule to identify which of said variable number of channels of cells require unloading; and
    at least one state machine coupled to said storage unit, said state machine to load interleaved incoming ATM cells into said free storage slots of said first plurality of storage slots as they arrive through said input communication line, and to unload said stored ATM cells out of their storage slots in a reordered sequence onto an output communication line in accordance with said channel-based unload schedule, one scheduled channel at a time, multiple cells per scheduled channel, thereby reducing channel switching,
    said at least one state machine to further update said tracking data structures as cells are loaded and unloaded, each of said variable number of channels being scheduled for unloading responsive to one of arrival of a last cell of a data packet for a particular channel and a number of cells stored for the particular channel reaching a predetermined level.

2. The apparatus as set forth in claim 1, wherein said storage unit stores said ATM cells in said first plurality of storage slots in a packaged form.

3. The apparatus as set forth in claim 1, wherein said storage unit stores said ATM cells in said first plurality of storage slots in an unpackaged form.

4. The apparatus as set forth in claim 1, wherein, for tracking the storage slots of currently stored ATM cells, and free storage slots of said first plurality of storage slots available for storing additional incoming ATM cells, said storage unit stores in said second plurality of storage slots:
    an array of linking relationship pointers corresponding to the first plurality of storage slots, each of said linking relationship pointers either pointing to another linking relationship pointer or denoting end of linking relationship;
    a channel state table having a plurality of channel entries for said variable number of channels, each channel entry comprising a start linking pointer pointing to one of said linking relationship pointers, the linking relationship pointer being corresponding to a particular one of said first plurality of storage slots storing a first ATM cell of the corresponding channel; and a first free-storage-slot pointer pointing to one of said linking relationship pointers, the linking relationship pointer being corresponding to a first free storage slot of said first plurality of storage slots available for storing a first additional one of said incoming ATM cells.

5. The apparatus as set forth in claim 4, wherein, each of said channel entries of said channel state table further comprises an end linking pointer pointing to one of said linking relationship pointers, the linking relationship pointer being corresponding to a particular one of said first plurality of storage slots storing a last ATM cell of the corresponding channel.

6. The apparatus as set forth in claim 4, wherein, each of said channel entries of said channel state table further comprises a residual linking pointer pointing to one of said linking relationship pointers, the linking relationship pointer being corresponding to a particular one of said first plurality of storage slots storing a partially unloaded ATM cell of the corresponding channel.

7. The apparatus as set forth in claim 4, wherein, each of said channel entries of said channel state table further comprises a bit denoting whether the corresponding channel is currently scheduled to be unloaded.

8. The apparatus as set forth in claim 1, wherein said storage unit stores in said third plurality of storage slots a plurality of ordered channel identifiers identifying the scheduled channels and the order the scheduled channels are to be unloaded.

9. The apparatus as set forth in claim 1, wherein, in addition to an incoming ATM cell having to be a last cell of a data packet for a channel or the incoming ATM cell having to cause the number of stored ATM cells for the channel to reach the predetermined level, said state machine schedules the channel to be unloaded only if the channel is currently unscheduled.

10. The apparatus as set forth in claim 1, wherein said state machine comprises a first portion for unloading stored ATM cells out of their storage slots in accordance to said channel-based unload schedule, said first portion entering an inactive state whenever said channel-based unload schedule becomes empty, and said first portion entering an active state whenever said channel-based unload schedule becomes non-empty.

11. The apparatus as set forth in claim 1, wherein said state machine unloads stored ATM cells of a scheduled channel in a manner that is optimized for a host computer.

12. The apparatus as set forth in claim 11, wherein said state machine unloads stored ATM cells of the scheduled channel in multiple bursts of n-bits independent of cell boundary alignment, and leaves residual data less than n-bits for a subsequent unload, unless the residual data is part of a last ATM cell of a data packet.

13. The apparatus as set forth in claim 1, wherein,
said at least one storage unit includes a first storage unit comprising said first storage slots for storing said ATM cells, and a second storage unit comprising said second and third storage slots for storing said tracking data structures and said channel-based unload schedule;
said at least one state machine comprises a load and an unload state machine for loading and unloading said ATM cells into and out of said first storage unit respectively.

14. The apparatus as set forth in claim 13, wherein,
said second storage unit and said load and unload state machines are disposed in a single network interface integrated circuit coupled to a system bus of a host computer, said network interface cellifying and reassembling transmit and receive packets partially on said host computer and partially on the network interface itself; and
said first storage unit is an external memory coupled to said network interface integrated circuit.

15. The apparatus as set forth in claim 13, wherein said first and second storage units, and said load and unload state machines are disposed on external integrated circuits designed to cooperate with a network interface integrated circuit coupled to a system bus of a host computer, said network interface cellifying and reassembling transmit and receive packets on said host computer.

16. In a network of computers, a method for routing interleaved asynchronous transfer mode (ATM) cells incoming from an input communication line to a host computer for a variable number of channels through an output communication line, with reduced amount of channel switching, said method comprising the steps of:

(a) loading and temporarily storing said interleaved incoming ATM cells, by at least one state machine, for said channels in a first storage unit comprising a first plurality of storage slots, said loading and storing being performed as said ATM cells arrive through said input communication line;

(b) tracking the storage slots of the currently stored ATM cells, by said at least one state machine, for said variable number of channels, and free storage slots of said first plurality of storage slots available for storing additional incoming ATM cells;

(c) scheduling, by said at least one state machine, a channel having ATM cells stored to be unloaded responsive to either arrival of a last cell of a data packet for the channel or a number of cells stored for the channel reaching a predetermined level; and (d) unloading, by said at least one state machine, the stored ATM cells in a reordered sequence in accordance with the scheduled channels onto the output communication line, one scheduled channel at a time, multiple cells per channel, thereby reducing channel switching.

17. The method as set forth in claim 16, wherein, said method further comprises the steps of:

(e) updating said tracking of the storage locations of the stored ATM cells for said unloaded channel, and free ones of said first plurality of storage slots available for storing additional incoming ATM cells; and (f) unscheduling the channel after unloading the channel's stored ATM cells.

18. The method as set forth in claim 17, wherein, said method further comprises the steps of:

(g) determining whether all scheduled channels have been unloaded; and (h) repeating said steps (d) through (g) until all scheduled channels have been unloaded.

19. A method for providing a function for routing interleaved incoming asynchronous transfer mode (ATM) cells comprising a variable number of channels with reduced amount of channel switching to a network interface, said method comprising the steps of:

(a) providing at least one storage unit comprising a first plurality of storage slots for storing said incoming ATM cells provided through an input communication line, a second plurality of storage slots for storing a plurality of data structures tracking the storage slots of said stored ATM cells for said variable number of channels, and tracking free storage slots of said first plurality of storage slots for storing additional incoming ATM cells, and a third plurality of storage slots for storing a channel-based unload schedule identifying which of said channels having stored ATM cells requiring unloading;

(b) providing at least one state machine coupled to said storage unit for loading said interleaved ATM cells into said storage unit as they arrive, and unloading said stored ATM cells out of their storage slots in a reordered sequence onto an output communication line, in accordance to said channel-based unload schedule, one scheduled channel at a time, multiple cells per scheduled channel, thereby reducing channel switching, said at least one state machine further updating said tracking data structures and said channel-based unload schedule as said loading and unloading are performed, each of said channels being scheduled for unloading responsive to either arrival of a last cell of a data packet for the channel or a number of cells stored for the channel reaching a predetermined level.

20. The method as set forth in claim 19, wherein said at least one storage unit and said at least one state machine are integrated with a network interface.

21. The method as set forth in claim 19, wherein said at least one storage unit and said at least one state machine are disposed on a cooperative integrated circuit external to a network interface.

* * * * *